(12) United States Patent
Bian et al.

(10) Patent No.: US 10,989,877 B2
(45) Date of Patent: Apr. 27, 2021

(54) NON-PLANAR WAVEGUIDE STRUCTURES

(71) Applicant: GLOBALFOUNDRIES U.S. INC., Santa Clara, CA (US)

(72) Inventors: Yusheng Bian, Ballston Lake, NY (US); Ajey Poovannummoottil Jacob, Watervliet, NY (US)

(73) Assignee: GLOBALFOUNDRIES U.S. INC., Santa Clara, CA (US)

( * ) Notice: Subject to any disclaimer, the term of this patent is extended or adjusted under 35 U.S.C. 154(b) by 0 days.

(21) Appl. No.: 16/507,642

(22) Filed: Jul. 10, 2019

(65) Prior Publication Data
US 2021/0011220 A1    Jan. 14, 2021

(51) Int. Cl.
*G02B 6/293* (2006.01)
*G02B 6/35* (2006.01)
*F21V 8/00* (2006.01)
*G02B 6/136* (2006.01)

(52) U.S. Cl.
CPC ....... *G02B 6/29346* (2013.01); *G02B 6/0081* (2013.01); *G02B 6/136* (2013.01); *G02B 6/3596* (2013.01)

(58) Field of Classification Search
CPC .. G02B 6/0081; G02B 6/136; G02B 6/29346; G02B 6/3596
See application file for complete search history.

(56) References Cited

U.S. PATENT DOCUMENTS

| | | | | |
|---|---|---|---|---|
| 3,663,194 A | * | 5/1972 | Greenstein | C03C 3/089 65/43 |
| 3,785,717 A | * | 1/1974 | Croset | G02B 6/12002 385/132 |
| 3,879,606 A | * | 4/1975 | Bean | G02B 6/42 250/227.11 |
| 4,169,001 A | * | 9/1979 | Kaiser | G02B 6/12002 156/250 |
| 4,472,020 A | * | 9/1984 | Evanchuk | B05D 3/06 385/14 |
| 4,835,500 A | * | 5/1989 | Sequeira | H01P 1/10 333/258 |
| 5,281,305 A | * | 1/1994 | Lee | G02B 6/12002 216/24 |
| 6,393,185 B1 | | 5/2002 | Deacon | |
| 6,526,203 B1 | | 2/2003 | Gonzalez et al. | |
| 6,587,629 B1 | * | 7/2003 | Maruyama | G02B 6/12004 385/129 |

(Continued)

OTHER PUBLICATIONS

Jones et al., "Ultra-low crosstalk, CMOS compatible waveguide crossings for densely integrated photonic interconnection networks", Optics Express, May 9, 2013, vol. 21, No. 10, 12 pages.

(Continued)

*Primary Examiner* — Daniel Petkovsek
(74) *Attorney, Agent, or Firm* — Anthony Canale; Andrew M. Calderon; Roberts Calderon Safran & Cole, P.C.

(57) ABSTRACT

The present disclosure relates to semiconductor structures and, more particularly, to non-planar waveguide structures and methods of manufacture. The structure includes: a first waveguide structure; and a non-planar waveguide structure spatially shifted from the first waveguide structure and separated from the first waveguide structure by an insulator material.

12 Claims, 5 Drawing Sheets

(56) References Cited

U.S. PATENT DOCUMENTS

| | | |
|---|---|---|
| 6,785,434 B2 | 8/2004 | Castoldi et al. |
| 6,985,648 B2 | 1/2006 | Kish, Jr. et al. |
| 7,095,920 B1* | 8/2006 | Little ................. G02B 6/12002 385/131 |
| 7,212,702 B1* | 5/2007 | Chu ................... G02B 6/02314 385/125 |
| 7,505,822 B2* | 3/2009 | Vishkin ..................... G02B 6/43 326/47 |
| 8,948,555 B1* | 2/2015 | Roth ....................... G02B 6/125 385/27 |
| 9,323,008 B2* | 4/2016 | He ........................... G02B 6/42 |
| 9,703,036 B2 | 7/2017 | He et al. |
| 9,709,738 B1 | 7/2017 | Dumais |
| 2005/0213873 A1* | 9/2005 | Piede ..................... G02B 6/125 385/14 |
| 2011/0129190 A1 | 6/2011 | Fini et al. |
| 2013/0108208 A1 | 5/2013 | Doerr |
| 2017/0254951 A1 | 9/2017 | Dumais et al. |
| 2019/0107672 A1 | 4/2019 | Jacob |
| 2019/0170946 A1* | 6/2019 | Tu ............................ G02B 6/12 |
| 2019/0391325 A1* | 12/2019 | Iida .......................... G02B 6/42 |
| 2020/0274215 A1* | 8/2020 | Morris .................... H01P 1/042 |

OTHER PUBLICATIONS

Shang et al., "Low-loss compact multilayer silicon nitride platform for 3D photonic integrated circuits", Optics Express, Aug. 6, 2015, vol. 23, No. 16, 9 pages.

Bian et al., "Efficient Cross-talk Reduction of Nanophotonic Circuits Enabled by Fabrication Friendly Periodic Silicon Strip Arrays", Scientific Reports, Nov. 20, 2017, 9 pages.

Khavasi et al., "Significant crosstalk reduction using alldielectric CMOS-compatible metamaterials", IEEE Photonics Technology Letters, vol. 28, No. 24, Dec. 15, 2016, 5 pages.

Kim et al., "Crosstalk Reduction in a Shallow-Etched Silicon Nanowire AWG", IEEE Photonics Technology Letters, vol. 20, No. 19, Oct. 1, 2008, 3 pages.

Shen et al., "Increasing the density of passive photonic-integrated circuits via nanophotonic cloaking", Nature Communications, Nov. 9, 2016, 9 pages.

Song et al., "High-density waveguide superlattices with low crosstalk", Nature Communications, May 11, 2015, 9 pages.

* cited by examiner

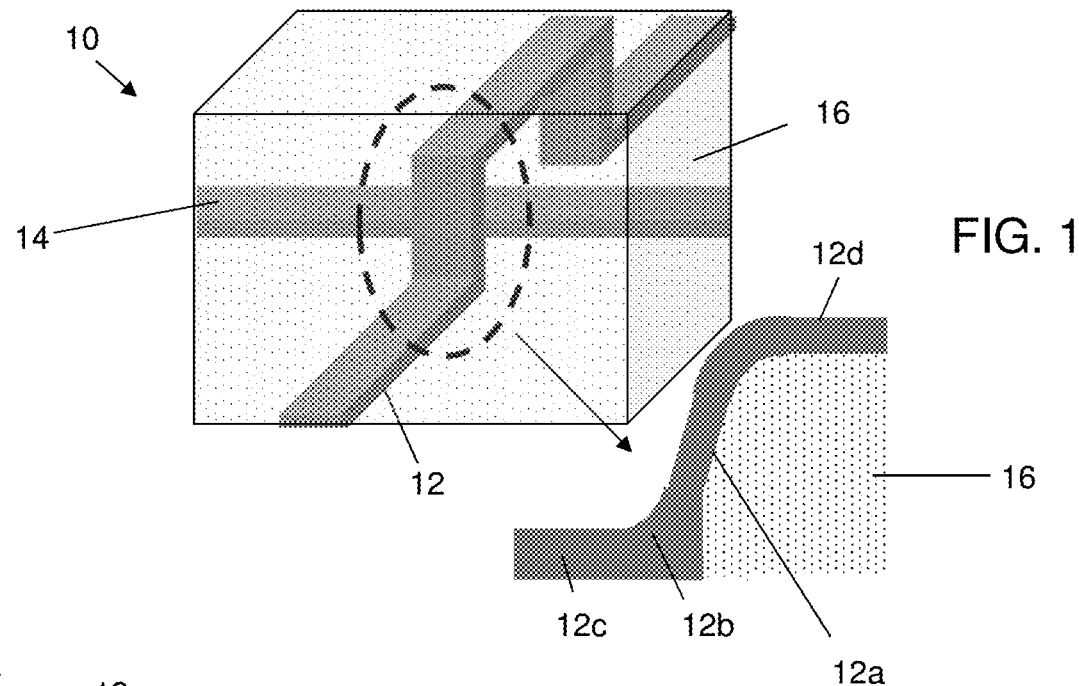
FIG. 1
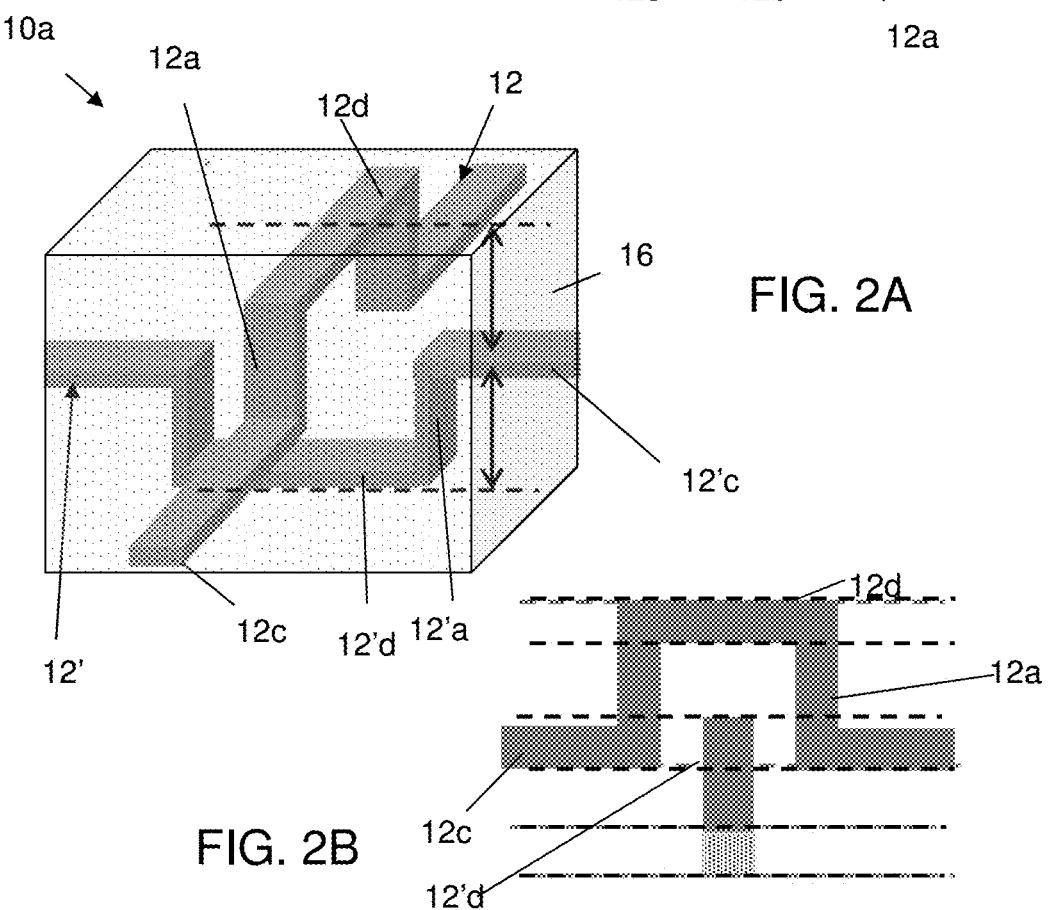
FIG. 2A
FIG. 2B

NON-PLANAR WAVEGUIDE STRUCTURES

FIELD OF THE INVENTION

The present disclosure relates to semiconductor structures and, more particularly, to non-planar waveguide structures and methods of manufacture.

BACKGROUND

Semiconductor optical waveguide structures (e.g., photonic components) are an important component of integrated optoelectronic systems. For example, a semiconductor optical waveguide structure is capable of guiding optical waves (e.g., light) with minimal loss of energy by restricting expansion of the light into the surrounding substrate. The optical waveguide structure can be used in many different applications including, e.g., semiconductor lasers, optical filters, switches, modulators, isolators, and photodetectors. The use of semiconductor material also enables monolithic integration into optoelectronic devices using known fabrication techniques.

In waveguide arrays, crosstalk occurs between orthogonal waveguide structures and between adjacent parallel waveguide channels. In the orthogonal waveguide structures, for example, multi-mode interference and self-imaging mechanisms are provided at a crossing of planar waveguide structures to reduce the crosstalk and any loss. On the other hand, in parallel waveguide structures, it is possible to enlarge the separation between adjacent waveguide structures, but the footprint and the packaging density are compromised.

SUMMARY

In an aspect of the disclosure, a structure comprises: a first waveguide structure; and a non-planar waveguide structure spatially shifted from the first waveguide structure and separated from the first waveguide structure by an insulator material.

In an aspect of the disclosure, a structure comprises: a first waveguide structure; and a non-planar waveguide structure adjacent to the first waveguide structure. The non-planar waveguide structure is composed of vertical and horizontal sections, where at least one of the vertical and horizontal sections is spatially shifted from the first waveguide structure to reduce cross talk between the first waveguide structure and the non-planar waveguide structure.

In an aspect of the disclosure, a structure comprises: a planar waveguide structure composed of fully or partially etched semiconductor material; and a non-planar waveguide structure composed of fully or partially etched semiconductor material and separated from the planar waveguide structure by insulator material. The non-planar waveguide structure is spatially shifted from the planar waveguide structure to reduce cross talk between the planar waveguide structure and the non-planar waveguide structure.

BRIEF DESCRIPTION OF THE DRAWINGS

The present disclosure is described in the detailed description which follows, in reference to the noted plurality of drawings by way of non-limiting examples of exemplary embodiments of the present disclosure.

FIG. 1 shows crossing waveguide structures in accordance with aspects of the present disclosure.

FIGS. 2A and 2B show crossing waveguide structures in accordance with additional aspects of the present disclosure.

DETAILED DESCRIPTION

Figure 3:
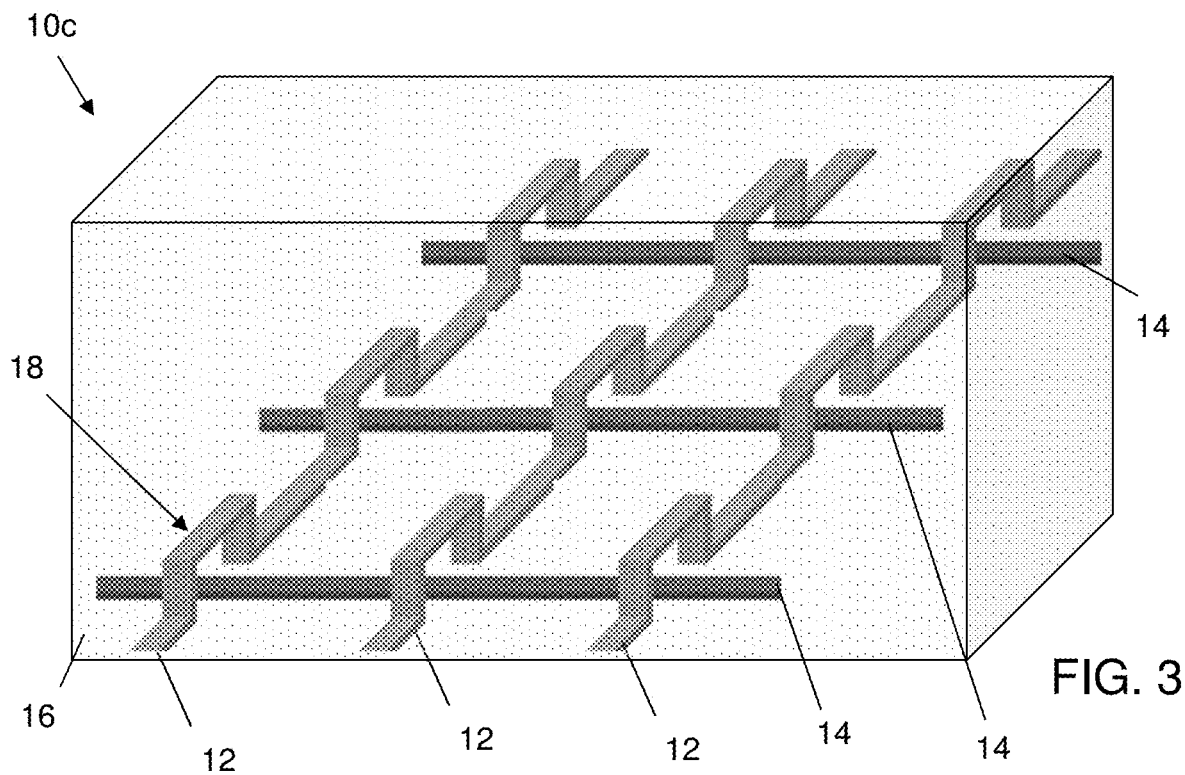
FIG. 3 shows an array of crossing waveguide structures in accordance with aspects of the present disclosure.

The present disclosure relates to semiconductor structures and, more particularly, to non-planar waveguide structures and methods of manufacture. More specifically, the present disclosure provides different combinations or arrays of non-planar waveguide structures. Advantageously, the use of non-planar waveguide structures enables decoupling of waveguide structures resulting in simultaneous reduction of insertion loss and crosstalk (compared to conventional planar arrays). More specifically, the use of non-planar waveguide structures shifted either vertically or longitudinally in an array will provide significant reduction of the crosstalk between orthogonal waveguide channels and crosstalk between parallel waveguide channels, while also providing low insertion loss and significant improvement of packing density.

The non-planar waveguide structures of the present disclosure can be manufactured in a number of ways using a number of different tools. In general, though, the methodologies and tools are used to form structures with dimensions in the micrometer and nanometer scale. The methodologies, i.e., technologies, employed to manufacture the non-planar waveguide structures of the present disclosure have been adopted from integrated circuit (IC) technology. For example, the structures are built on wafers and are realized in films of material patterned by photolithographic processes on the top of a wafer. In particular, the fabrication of the non-planar waveguide structures use three basic building blocks: (i) deposition of thin films of material on a substrate, (ii) applying a patterned mask on top of the films by photolithographic imaging, and (iii) etching the films selectively to the mask.

FIG. 1 shows crossing waveguide structures in accordance with aspects of the present disclosure. Specifically, the structure 10 shown in FIG. 1 includes a non-planar waveguide structure 12 crossing a planar waveguide structure 14. As in each of the embodiments described herein, the waveguide structures 12, 14 do not touch one another and, preferably, are separated by an insulator material 16, e.g., oxide material. In the embodiment shown in FIG. 1, for example, the non-planar waveguide structure 14 is formed on an oxide mesa (represented by reference numeral 16) as described in more detail with respect to FIGS. 9A-9F.

As in each of the embodiments described herein, the non-planar waveguide structure 12 and the planar waveguide structure 14 can be composed of semiconductor material which is suitable for reflecting and propagating optical signals with minimal loss. For example, the waveguide structures 12, 14 (or any embodiment described herein) can be composed of any combination of Si and SiN. More specifically, the waveguide structures 12, 14 can both be Si or SiN. Alternatively, the waveguide structure 12 can be Si and the waveguide structure 14 can be SiN, or vice versa. Moreover, in each of the embodiments, the waveguide structures can be fabricated by fully or partially (thinning) etching the waveguide material (e.g., Si, SiN, etc.) using conventional lithography and etching (reactive ion etching) fabrication methods known to those of skill in the art such that no further explanation is required herein for a complete understanding of the present disclosure.

As further shown in FIG. 1, the waveguide structure 12 is a non-planar waveguide structure which crosses over or under the planar waveguide structure 14. In embodiments, the non-planar waveguide structure 12 can include vertically oriented sections 12a and curved or rounded corners 12b extending between the vertically oriented sections 12a and planar (e.g., horizontal) sections 12c, 12d. The rounded or curved corners 12b can have a radius of about 10 to 15 nm; although other dimensions are contemplated herein. The vertical section 12a can also be provided at different angles including a non-vertical angle, e.g., 90° to 120°.

In embodiments, the planar, horizontal sections 12c can be on a same plane as the planar waveguide structure 14; whereas, the planar section 12d is at a different plane (level) than the planar waveguide structure 14. That is, the planar section 12d is vertically shifted with respect to the planar waveguide structure 14. It is also contemplated that the planar sections 12c can be on a different level (vertically shifter) from the planar waveguide structure 14, preferably remaining above the planar waveguide structure 14.

FIGS. 2A and 2B show crossing waveguide structures in accordance with additional aspects of the present disclosure. More specifically, FIG. 2A shows a perspective view of a structure 10a comprising crossing non-planar waveguide structures 12, 12'; whereas, FIG. 2B shows a cross-sectional view of the crossing non-planar waveguide structures 12, 12'. Similar to the embodiment of FIG. 1, the non-planar waveguide structure 12 is crossing over the non-planar waveguide structure 12' such that they are vertically shifted from one other. Also, as previously described, the non-planar waveguide structures 12, 12' are separated by insulator material 16 and can be composed of any suitable semiconductor material.

Still referring to FIGS. 2A and 2B, each of the non-planar waveguide structures 12, 12' includes respective vertically oriented sections 12a, 12'a and curved or rounded corners extending between the vertically oriented sections 12a, 12'a and planar (e.g., horizontal) sections 12c, 12'c and 12d, 12'd. As noted previously, the rounded or curved corners can have a radius of about 10 to 15 nm and the vertical sections can be at a non-vertical angle, e.g., 90° to 120°.

In this embodiment, the planar section 12'd of the waveguide structure 12' can be on a same plane as the planar section 12c of the waveguide structure 12; whereas, the planar sections 12d, 12'c can be at a different plane (level). Also, the planar section 12'c may be at a different plane than both the planar sections 12c of the planar waveguide structure 12, preferably remaining above the planar waveguide structure 12. Other configurations are also contemplated herein, noting that at least one of the sections should preferably be shifted vertically and/or longitudinally from another section of an adjacent waveguide structure.

FIG. 3 shows a three-dimensional (3D) waveguide crossing array 10c which includes a plurality of spaced apart non-planar waveguide structures 12 and a plurality of spaced apart planar waveguide structures 14. The plurality of spaced apart non-planar waveguide structures 12 and the plurality of spaced apart planar waveguide structures 14 are each separated by insulator material 16. As further shown, the plurality of spaced apart non-planar waveguide structures 12 are parallel to one another; whereas, the plurality of spaced apart planar waveguide structures 14 are orthogonal to the spaced apart non-planar waveguide structures 12. Also, the non-planar waveguide structures 12 are located over (or under) the planar waveguide structures 14 at each respective crossing point 18. Cross talk is significantly reduced due to the phase shifting between the adjacent waveguide structures 12, 14.

Figure 4:
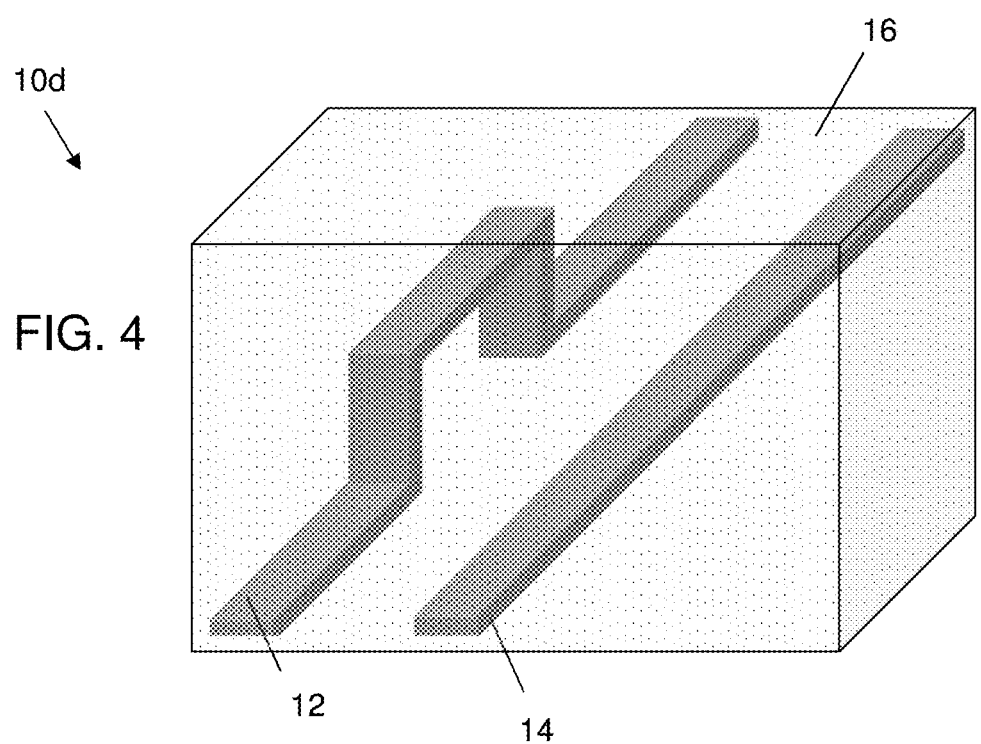
FIG. 4 shows spatially shifted waveguide structures, in parallel, in accordance with aspects of the present disclosure.

FIG. 4 shows spatially shifted waveguide structures 12, 14 in parallel. More specifically, the structure 10d of FIG. 4 includes a non-planar waveguide structure 12 in parallel with a planar waveguide structure 14. In this embodiment, the non-planar waveguide structure 12 is spatially-shifted (vertically shifted) from the planar waveguide structure 14. That is, at least the non-planar portion of the non-planar waveguide structure 12 is vertically shifted from the planar waveguide structure 14. As already noted herein, the waveguide structures 12, 14 do not touch one another and, preferably, are separated by the insulator material 16, e.g., oxide material. Also, as previously described, the non-planar waveguide structure 12 and the planar waveguide structure 14 can be composed of any suitable combination of semiconductor material.

Figure 5:
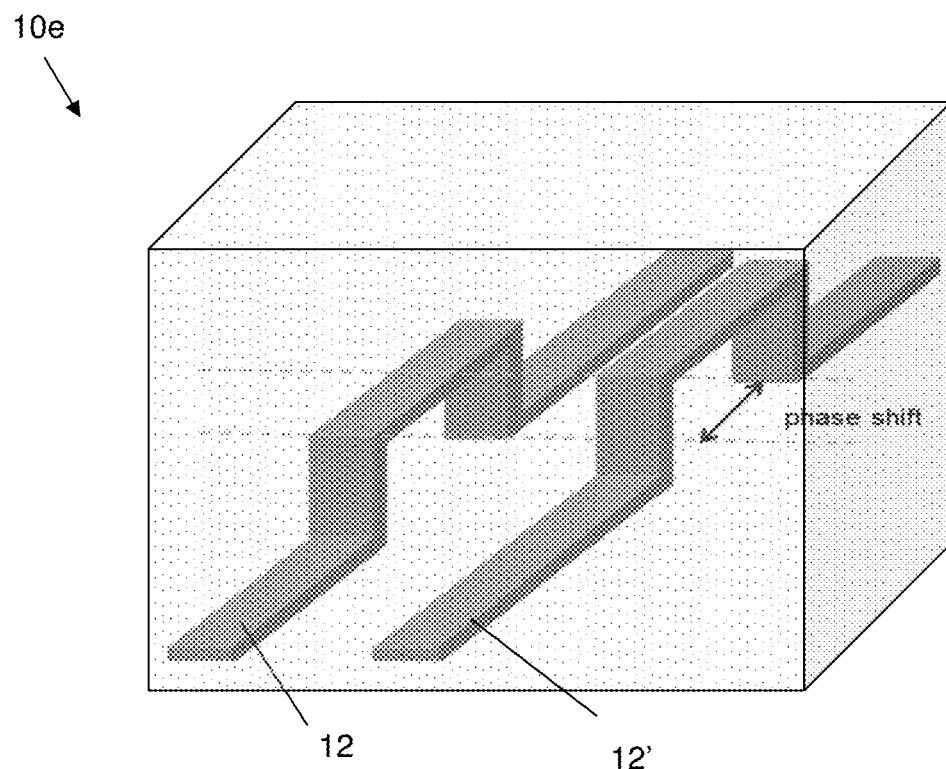
FIG. 5 shows spatially shifted waveguide structures, in parallel, in accordance with additional aspects of the present disclosure.

FIG. 5 shows spatially shifted waveguide structures 12, 12', in parallel. More specifically, the structure 10e of FIG. 5 includes parallel non-planar waveguide structures 12, 12". In this embodiment, the non-planar waveguide structure 12 is spatially-shifted (i.e., longitudinally shifted) from the non-planar waveguide structure 12'. In this way, the non-planar portions of the non-planar waveguide structures 12, 12' are not aligned with one another. As already noted herein, the waveguide structures 12, 12' do not touch one another and, preferably, are separated by the insulator material 16, e.g., oxide material. Also, for example, the non-planar waveguide structures 12, 12' can be composed of any suitable combination of semiconductor material as already described herein. Further, as described herein, each of the non-planar waveguide structures 12, 12' include vertically oriented sections and curved or rounded corners extending between the vertically oriented sections and planar sections.

Figure 6:
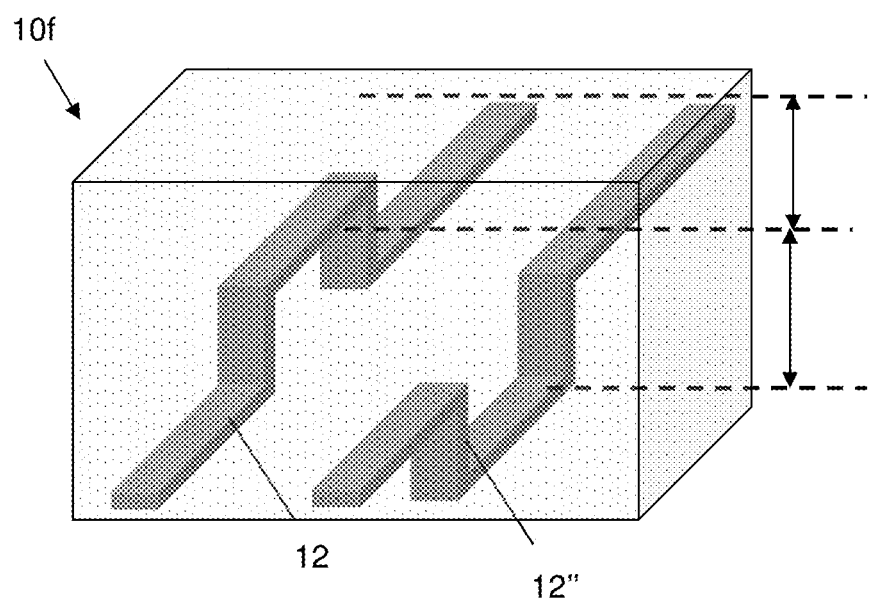
FIG. 6 shows spatially shifted waveguide structures, in parallel, in accordance with additional aspects of the present disclosure.

FIG. 6 shows spatially shifted waveguide structures 12, 12", in parallel. More specifically, the structure 10f of FIG. 6 includes parallel non-planar waveguide structures 12, 12". In this embodiment, the non-planar waveguide structure 12 is spatially-shifted (e.g., vertically shifted) from the non-planar waveguide structure 12". By way of example, the non-planar waveguide structures 12, 12" can be spatially shifted by 180°. Also, as already noted herein, the waveguide structures 12, 12" do not touch one another and, preferably, are separated by the insulator material 16, e.g., oxide material. Also, the non-planar waveguide structures 12, 12" can be composed of any suitable combination of semiconductor material as described herein. Also, as described herein, the non-planar waveguide structures 12, 12" include vertically oriented sections and curved or rounded corners extending between the vertically oriented sections and planar sections.

Figure 7:
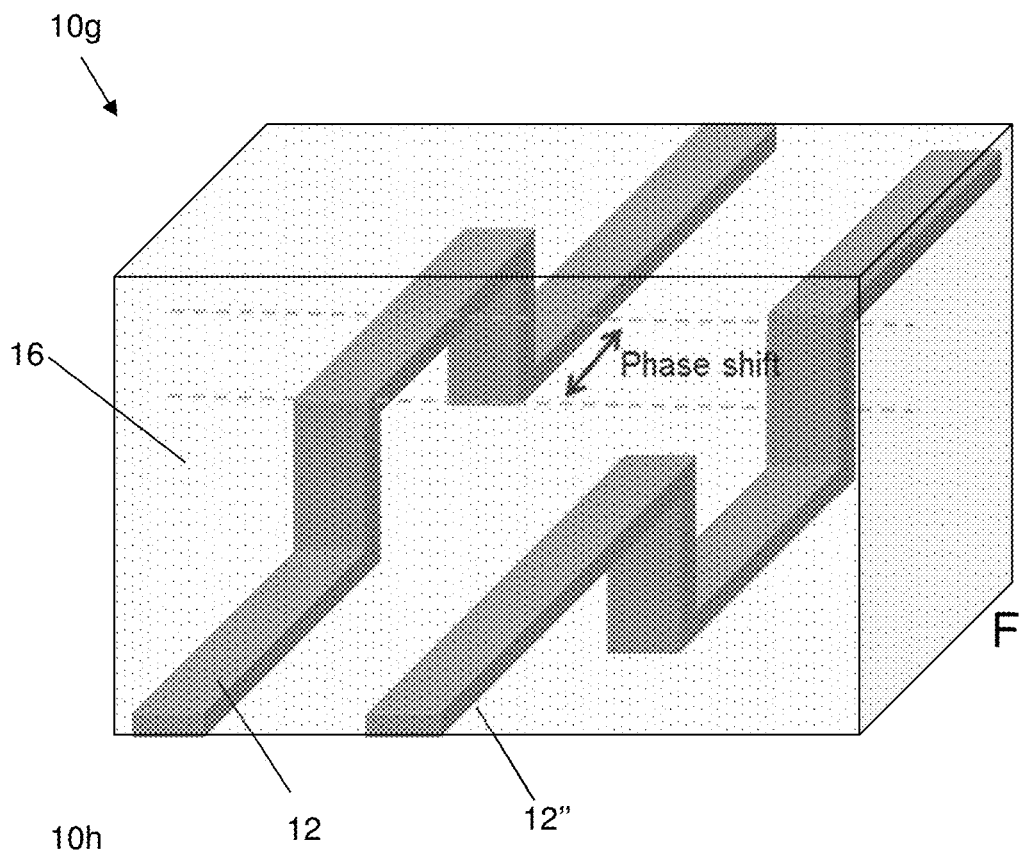
FIG. 7 shows spatially shifted waveguide structures, in parallel, in accordance with additional aspects of the present disclosure.

FIG. 7 shows spatially shifted waveguide structures 12, 12", in parallel. More specifically, the structure 10g of FIG. 7 includes parallel non-planar waveguide structures 12, 12", which are spatially-shifted both vertically and longitudinally. Again, as noted herein, the waveguide structures 12, 12" do not touch one another and, preferably, are separated by the insulator material 16, e.g., oxide material. Also, the non-planar waveguide structures 12, 12" can be composed of any suitable combination of semiconductor material. Also, as described herein, the non-planar waveguide structures 12, 12" include vertically oriented sections and curved or rounded corners extending between the vertically oriented sections and planar sections.

Figure 8:
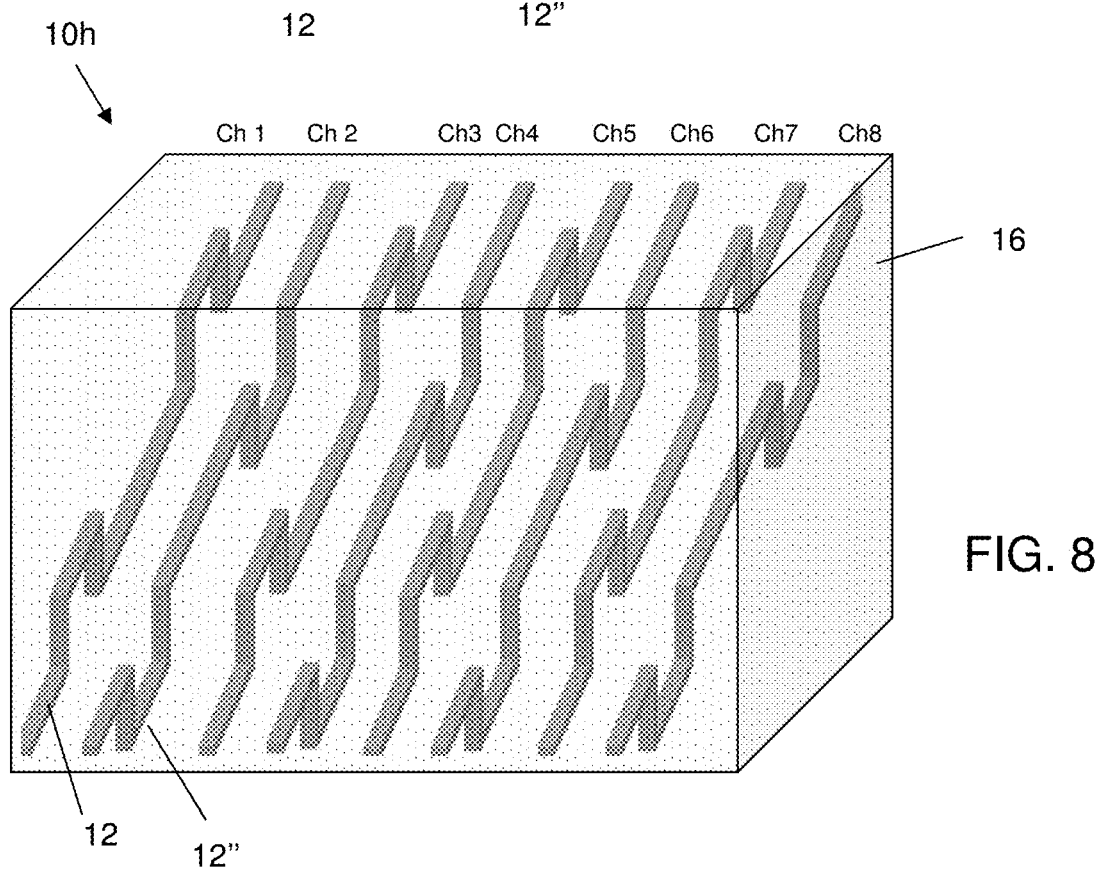
FIG. 8 shows an array of spatially shifted waveguide structures, in parallel, in accordance with aspects of the present disclosure.

FIG. 8 shows an array of spatially shifted waveguide structures, in parallel. More specifically, the array 10h includes eight (8) channels composed of alternating non-planar waveguide structures 12, 12". The alternating non-planar waveguide structures 12, 12" are parallel to each other and are separated from one another by insulator material 16. In embodiments, the alternating non-planar waveguide structures 12, 12" are shown to be vertically and/or longitudinally shifted from each adjacent alternating non-planar waveguide structures 12, 12". As in each of the embodiments described herein, the spatially-shifted waveguide array enables low inter-channel crosstalk, compact footprint and high packing density.

The spatially-shifted waveguide array features much longer coupling length and lower inter-channel crosstalk compared to conventional planar waveguide arrays. For example, the coupling length of the spatially-shifted waveguide array can be 95 µm, compared to 23 µm for planar arrays. With the same coupling length, the spatially-shifted waveguide arrays demonstrate smaller edge-to-edge spacing between adjacent waveguide channels, which will enable smaller-footprint photonic chips and integrated circuits with higher packing density.

Figure 9A:
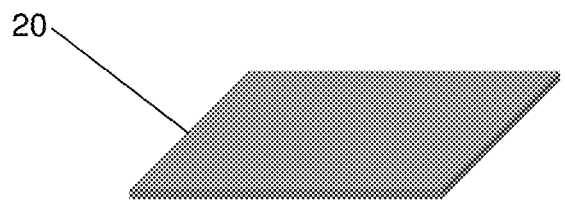
FIGS. 9A-9F show illustrative fabrication processes of forming a non-planar waveguide structure in accordance with aspects of the present disclosure.

FIGS. 9A-9F show illustrative fabrication processes of forming a non-planar waveguide structure in accordance with aspects of the present disclosure. As shown in FIG. 9A, appropriate semiconductor material 20 for a waveguide structure is deposited, for example, on an insulator material. The material 20 can be deposited by any conventional deposition process, e.g., chemical vapor deposition (CVD) processes.

Figure 9B:

In FIG. 9B, the material 20 is patterned into a planar waveguide structure 14. The patterning can be performed by conventional lithography and etching processes. For example, a resist formed over the material 20 is exposed to energy (light) to form a pattern (opening). An etching process with a selective chemistry, e.g., reactive ion etching (RIE), will be used to the patterned material (e.g., planar waveguide structure 14) through the openings of the resist. The resist can then be removed by a conventional oxygen ashing process or other known stripants.

Figure 9C:
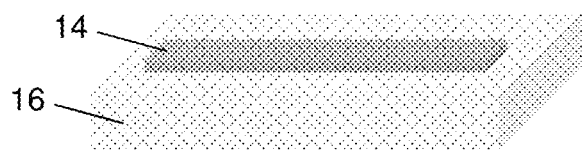

As shown in FIG. 9C, following the resist removal, insulator material 16 is deposited over the planar waveguide structure 14. The insulator material 14 can be an oxide material deposited by any conventional deposition processes, e.g., CVD processes. The insulator material 16 can be formed into a mesa using conventional lithography and etching processes.

Figure 9D:
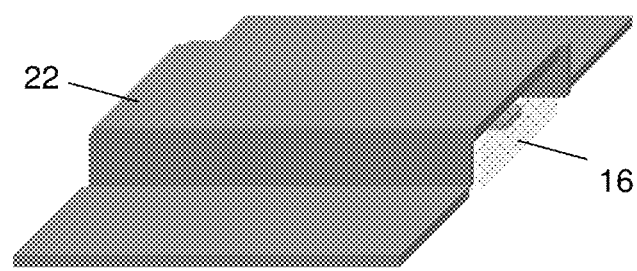
Figure 9E:
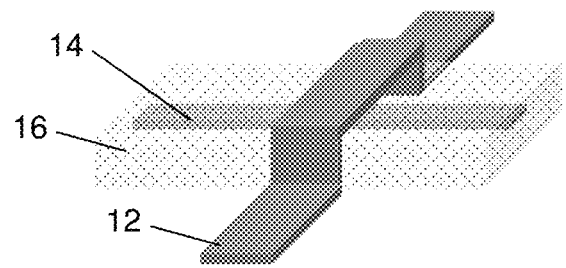
Figure 9F:
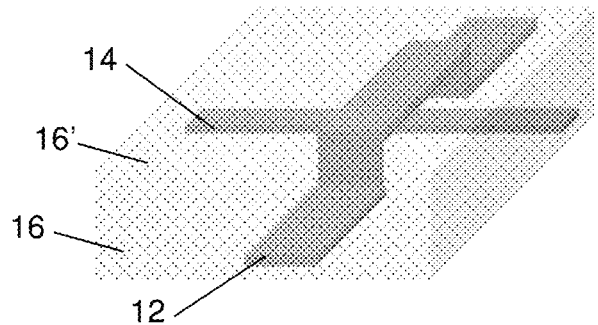

In FIG. 9D, appropriate semiconductor material 22 for a non-planar waveguide structure is deposited, on the mesa, e.g., insulator material 16. The material 22 can be deposited by any conventional deposition process, e.g., CVD processes. In FIG. 9E, the material 22 is patterned into a non-planar waveguide structure 12 using conventional lithography and etching processes as already described herein. Following the patterning, additional insulator material 16' can be deposited on the patterned non-planar waveguide structure 12.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a first non-planar waveguide structure comprising semiconductor material and, from a cross-sectional view, the first non-planar waveguide structure comprising upper horizontal sections and a lower horizontal section on a different plane than the upper horizontal sections, the upper horizontal sections being connected to the lower horizontal section by vertical upward extending section; and
   a second non-planar waveguide structure comprising the semiconductor material, from a cross-sectional view, the second non-planar waveguide structure comprising an upper horizontal section and lower horizontal sections on a different plane than the upper horizontal section, the upper horizontal section being connected to the lower horizontal sections by vertical extending sections, and the second non-planar waveguide structure being spatially shifted in a vertical orientation from the first non-planar waveguide structure such that the lower horizontal sections of the second non-planar waveguide structure and the upper horizontal sections of the second non-planar waveguide structure are in a different plane and separated from one another in both the vertical orientation and a horizontal orientation by an insulator material.

2. The structure of claim 1, wherein the first non-planar waveguide structure crosses the second non-planar waveguide structure.

3. The structure of claim 2, wherein the crossing occurs at a non-planar portion of the second non-planar waveguide structure.

4. The structure of claim 1, wherein the first non-planar waveguide structure is vertically shifted and crosses over the second non-planar waveguide structure.

5. The structure of claim 4, wherein the first non-planar waveguide structure is vertically shifted by 180 degrees from the non-planar waveguide structure.

6. The structure of claim 1, wherein the second non-planar waveguide structure includes rounded corners, the rounded corners transitioning between the vertical extending sections and the lower horizontal sections and the upper horizontal section.

7. The structure of claim 6, wherein the first non-planar waveguide structure and the second non-planar waveguide structure cross between the vertical extending sections of the second non-planar waveguide structure and the lower horizontal sections of the second non-planar waveguide are on a same plane as the upper horizontal sections of the first non-planar waveguide.

8. The structure of claim 6, wherein at least one of the vertical extending sections and lower horizontal sections of the second non-planar waveguide structure is spatially shifted from the first non-planar waveguide structure to reduce cross talk between the first non-planar waveguide structure and the non-planar waveguide structure.

9. The structure of claim 6, wherein the semiconductor material of the first non-planar waveguide structure and the second non-planar waveguide structure is fully or partially etched semiconductor material composed of Si or SiN material.

10. The structure of claim 1, wherein the lower horizontal sections of the second non-planar waveguide structure are planar sections, with curved or rounded corners extending between the vertical extending sections and the planar sections.

11. The structure of claim 10, wherein the curved or rounded corners are an outside radius between the vertical sections and an upper planar horizontal section of the planar sections.

12. The structure of claim 11, wherein the curved or rounded corners are also an inside radius between the vertical sections and lower planar horizontal sections of the planar sections.

* * * * *